United States Patent
Okuhara (10) Patent No.: US 6,452,952 B1
(45) Date of Patent: Sep. 17, 2002

(54) DIGITAL INFORMATION PROCESSING SYSTEM WITH COPY PROTECTION SUBSYSTEM

(75) Inventor: Yasuhiko Okuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/112,343

(22) Filed: Jul. 9, 1998

(30) Foreign Application Priority Data

Sep. 7, 1997  (JP) .............................................. 9-183505

(51) Int. Cl.⁷ .......................... H04L 12/00; H04L 12/22
(52) U.S. Cl. ....................... 370/536; 370/498; 370/535; 370/542; 370/912; 348/423.1; 348/462; 348/465; 348/473; 380/201
(58) Field of Search .......................... 348/388.1, 423.1, 348/462, 465, 473; 370/465, 473, 498, 535, 536, 542, 902, 912; 380/201

(56) References Cited

U.S. PATENT DOCUMENTS

| | | | | |
|---|---|---|---|---|
| 5,315,448 A | | 5/1994 | Ryan ........................... 360/60 |
| 5,742,623 A | * | 4/1998 | Nuber et al. ............... 371/47.1 |
| 5,757,909 A | * | 5/1998 | Park ............................ 380/5 |
| 5,799,081 A | * | 8/1998 | Kim et al. .................... 380/5 |
| 5,818,533 A | * | 10/1998 | Auld et al. ................. 348/412 |
| 5,870,087 A | * | 2/1999 | Chau ........................ 345/302 |
| 5,870,474 A | * | 2/1999 | Wasilewski et al. .......... 380/21 |
| 5,907,656 A | * | 5/1999 | Oguro ......................... 386/94 |
| 5,920,626 A | * | 7/1999 | Durden et al. ............... 380/10 |
| 5,923,754 A | * | 7/1999 | Angelo et al. ................ 380/4 |
| 5,987,126 A | * | 11/1999 | Okuyama et al. .............. 380/5 |
| 5,991,865 A | * | 11/1999 | Longhenry et al. ........... 712/7 |
| 6,058,122 A | * | 5/2000 | Hwang et al. .............. 370/522 |
| 6,269,107 B1 | * | 7/2001 | Jong ......................... 370/535 |
| 6,275,507 B1 | * | 8/2001 | Andeson et al. ............ 370/487 |

FOREIGN PATENT DOCUMENTS

| | | |
|---|---|---|
| JP | 1-158668 | 6/1989 |
| JP | 3-147490 | 6/1991 |
| JP | 8-186667 | 7/1996 |
| JP | 8-507912 | 8/1996 |

* cited by examiner

Primary Examiner—Hassan Kizou
Assistant Examiner—Joe Logsdon
(74) Attorney, Agent, or Firm—Foley & Lardner

(57) ABSTRACT

A digital information processing system ensures illegal-copy protection of video and audio signals without changing the structure or format of a stream of multiplexed video, audio and data packets. A packet demultiplexer selects packets from a packet stream according to the packet identifiers (PID) of the packets. The packet demultiplexer has a first output port electrically connected to video and audio signal decoders, and a second output port for digital processing such as storage. When a selected packet is a video or audio packet, the packet demultiplexer outputs the selected packet through the first output port. When the selected packet is a data packet, and packet demultiplexer outputs the selected packet through the second output port.

10 Claims, 6 Drawing Sheets

DIGITAL INFORMATION PROCESSING SYSTEM WITH COPY PROTECTION SUBSYSTEM

BACKGROUND OF THE INVENTION

1. Field of the Invention

The present invention relates to a digital information processing system and more particularly, to a digital information processing system with a copy protection subsystem, which plays back a stream of multiplexed video, audio, and data packets of programs or services that have been packet-multiplexed in conformity with the standard given by the Moving Picture coding Experts Group (MPEG) (i.e., the MPEG standard), while preventing the programs or services from being copied illegally.

2. Description of the Prior Art

To protect the programs or services from being copied illegally in digital information processing systems of this sort, conventionally, several copy protection methods have been developed and reported.

For example, (a) some protection scheme is mixed into or added to the analog video, audio, and data signals of a program or programs to be copy-protected, (b) a specific protection code is additionally mixed into or added to the digital video, audio, and data signals of a program or programs to be copy-protected, or (c) the digital video, audio, and data signals of a program or programs to be copy-protected are scrambled.

Figure 1:
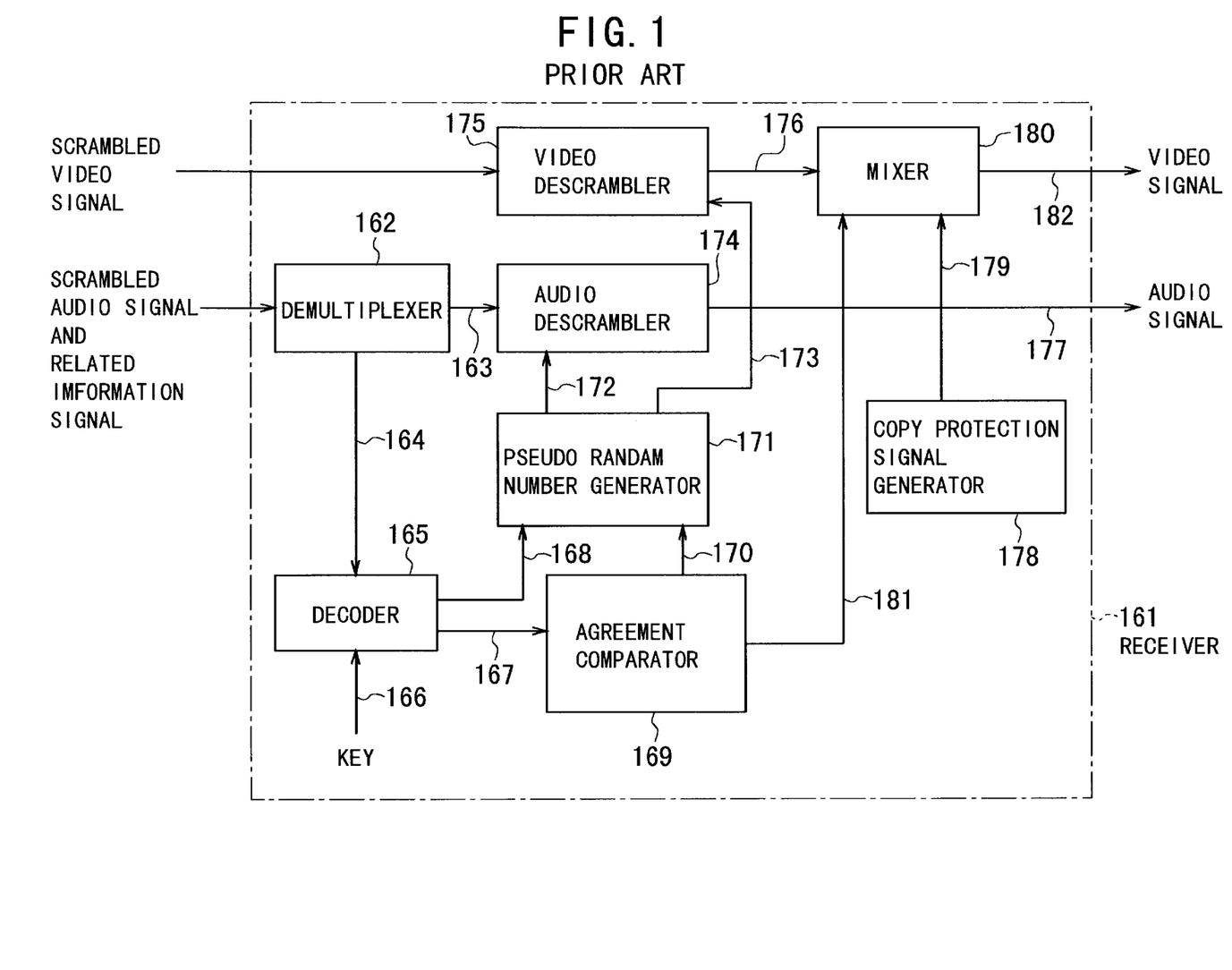
FIG. 1 is a block diagram of a conventional digital information processing system, which serves as a broadcasting receiver apparatus.

FIG. 1 shows a conventional broadcasting receiver apparatus 161 designed for receiving toll broadcasting waves, which is disclosed in the Japanese Non-Examined Patent Publication No. 3-147490 published in 1991.

In the conventional broadcasting receiver apparatus 161, as shown in FIG. 1, a demultiplexer 162 demultiplexes an audio signal and a related information signal that have been multiplexed and scrambled, thereby outputting a scrambled audio signal 163 to an audio descrambler 174 and a scrambled related information signal 164 to a decoder 165.

The decoder 165 decodes or deencrypts the related information signal 164 thus inputted using a key signal 166, thereby outputting an agreement signal 167 to an agreement comparator circuit 169 and an initializing signal 168 to a pseudo random-number generator 171.

The agreement comparator circuit 169 compares the content of the agreement signal 167 to the content of the built-in agreement of the receiver apparatus 161, and outputs a comparison result signal 170 to the pseudo random-number generator 171 and a control signal 181 to a mixer 180.

According to the initializing signal 168 and the comparison result signal 170 thus received, the pseudo random-number generator 171 generates a sequence 172 of pseudo random numbers for audio signals and a sequence 173 of pseudo random numbers for video signals. The pseudo random-number sequence 172 for audio signals and the pseudo random-number sequence 173 for video signals are inputted into the audio descrambler 174 and a video descrambler 175, respectively.

The control signal 181 from the agreement comparator circuit 169 is used to control the mixer 180.

The audio descrambler 174 descrambles the scrambled audio signal 163 and outputs an analog audio signal 177 which is the same as the original audio signal. The analog audio signal 177 is then reproduced or played back by an audiovisual playback system (not shown).

The video descrambler 175 descrambles a scrambled video signal thus received and outputs an analog video signal 176 to the mixer 180. The analog video signal 176 is the same as the original video signal.

A copy-protection signal generator 178 generates a copy protection signal 179 and supplies the signal 179 to the mixer 180. According to the control signal 181 outputted from the agreement comparator circuit 169, the mixer 180 performs a mixing operation of the copy protection signal 179 with the analog video signal 176 outputted from the video descrambler 175.

Specifically, when the agreement signal 167 from the decoder 165 does not accord with the content of the built-in agreement of the receiver apparatus 161, the mixer 180 performs the mixing operation of the copy protection signal 179 with the analog video signal 176 according to the control signal 181. Then, the mixer 180 outputs the mixed video signal 176 to the audiovisual playback system (not shown) as a video signal 182.

On the other hand, when the agreement signal 167 from the decoder 165 accords with the content of the built-in agreement of the receiver apparatus 161, the mixer 180 does not perform the mixing operation of the copy protection signal 179 with the analog video signal 176 according to the control signal 181. In this case, therefore, the mixer 180 outputs the inputted video signal 176 without any change as the video signal 182 to the audiovisual playback system (not shown).

With the conventional receiver apparatus 161 having the above-described configuration, a control or copy-protection bit to enable or disable the copy-protection function is provided in the related information signal in advance. The related information signal is encrypted in a transmitter and then transmitted by the transmitter.

In the receiver apparatus 161 shown in FIG. 1, the related information signal is demultiplexed by the demuliplexer 162 and then, deencrypted by the decoder 165 using the key signal 166.

Subsequently, the content of the agreement contained in the related information signal 164 thus deencrypted is compared with the content of the built-in agreement of the receiver apparatus 161 by the agreement comparator circuit 169. According to the result of this comparison, it is judged whether the copy protection signal 179 is mixed into the descrambled video signal 176 or not.

When the content of the agreement contained in the related information signal 164 accords with the content of the built-in agreement of the receiver 161, the agreement comparator circuit 169 instructs the mixer 180 not to mix the copy protection signal 179 with the descrambler video signal 176 through the control signal 181. In this case, the outputted video signal 182 from the mixer 180 can be recorded into a recording medium by using a Video Tape Recorder (VTR) or the like, and it can be normally played back for watching and listening from the medium.

On the other hand, when the content of the agreement contained in the related information signal 164 does not accord with the content of the built-in agreement of the receiver apparatus 161, the agreement comparator circuit 169 instructs the mixer 180 to mix the copy protection signal 179 with the descrambled video signal 176 through the control signal 181. In this case, although the video signal 182 outputted from the mixer 180 can be recorded into a recording medium, the quality of the played-back video signal 182 from the recorded medium degrades greatly so that it is difficult or unable to be watched and listened.

An example of the copy-protection signal 179 is an amplitude-varying pulse signal, which is added to or mixed with a scanning signal in the vertical blanking period of a video signal. The amplitude of the pulse signal varies at individual fields or at a longer period than the that of the fields. In this case, an Automatic Gain Control (AGC) circuit in a reproducing or play-back system such as a VTR is affected by the amplitude-varying pulse signal and as a result, the level of the played-backed video signal from the recorded medium fluctuates so that it is difficult or unable to be watched and listened.

The video and audio signals 182 and 177 can be played back normally on a TV screen independent of the existence and absence of mixing of the copy-protection signal 179.

The above-described conventional receiver apparatus 161 shown in FIG. 1 has the following problems.

Firstly, the control or copy-protection bit needs to be additionally provided in the related information signal to prevent illegal copy of the programs or services. Therefore, to cope with the control or copy-protection bit thus added, some subsystem is essentially provided not only at the receiver side but also at the transmitter side. In other words, a dedicated bit for copy protection needs to be additionally provided in the control format at the transmitter side and at the same time, a dedicated process or processor needs to be additionally provided at the receiver side.

Thus, there is a problem that the circuit scale becomes large and the fabrication cost becomes high.

Second, the illegal-copy protection of the programs or services is implemented with the use of scrambling of the video, audio, and related information signals and mixing of the copy-protection signal 179 to the video signal 176 in the conventional receiver apparatus 161. Therefore, if the configuration of the conventional receiver apparatus 161 is redesigned so that the video, audio, and related information signals are processed in personal computers (PCs) with data storage media, not only the related information signal but also the video and audio signals may be freely supplied to the data bus of the PCs. This means that the video and audio signals can be digitally recorded or copied into the data storage media of the PCs.

Thus, there is another problem that the data signal excluding the video and audio signals is not selectively recorded into the data storage media of the PCs.

SUMMARY OF THE INVENTION

Accordingly, an object of the present invention is to provide a digital information processing system that ensures illegal-copy protection of video and audio signals without changing the structure or format of a stream of multiplexed video, audio, and data packets.

Another object of the present invention is to provide a digital information processing system that prevents video and audio signals from being outputted to a data processing path for a data storage medium.

Still another object of the present invention is to provide a digital information processing system in which a data signal excluding video and audio signals is selectively recorded into a data storage medium.

The above objects together with others not specifically mentioned will become clear to those skilled in the art from the following description.

A digital information processing system according to the present invention is comprised of (a) a packet stream processor for extracting a stream of multiplexed video, audio, and data packets that have been multiplexed in a source signal in conformity with the MPEG standard, and (b) a packet demultiplexer for demultiplexing the stream of the multiplexed packets by selecting one of the packets in the stream according to an assigned packet identifier (PID) of the packets.

The packet demultiplexer has a first output port electrically connected to video and audio signal decoders, and a second output port for digital processing such as storage.

When the selected one of the packets is a video or audio packet, the packet demultiplexer outputs the selected one of the packets through the first output port.

When the selected one of the packets is a data packet, the packet demultiplexer outputs the selected one of the packets through the second output port.

With the digital information processing system according to the present invention, the stream of multiplexed video, audio, and data packets that have been multiplexed in the source signal in conformity with the MPEG standard is extracted by the packet stream processor and then, the stream of the multiplexed packets is demultiplexed by the packet demultiplexer by selecting one of the packets in the stream according to an assigned or specified PID of the packets.

Further, when the selected one of the packets is a video or audio packet, the packet demultiplexer outputs the selected one of the packets through the first output port electrically connected to the video and audio signal decoders. When the selected one of the packets is a data packet, the packet demultiplexer outputs the selected one of the packets through the second output port for digital processing such as storage.

Thus, a data signal derived from the data packet is able to be digitally stored in a suitable storage medium through the second output port of the packet demultiplexer while video and audio signals derived from the video and audio packets are prevented from being outputted to a data processing path for a data storage medium. In other words, the data signal excluding the video and audio signals is selectively recorded into a data storage medium. The video and audio signals derived from the video and audio packets are played back or reproduced by the video and audio signal decoders.

As a result, illegal-copy protection of the audio and visual signals is ensured without changing the structure or format of the stream of the multiplexed video, audio, and data packets.

Further, because no change is required for the structure or format of the stream of the multiplexed video, audio, and data packets, the circuit scale of the digital information processing system does not become large and the fabrication cost thereof does not become high.

In a preferred embodiment of the system according to the present invention, the packet demultiplexer includes a packet-type information extractor for extracting a packet-type information included in the stream according to the assigned PID of the packets, and a packet-type checker for checking the type of the packets using the packet-type information extracted by the extractor and for selectively outputting the video and audio packets to the first output port and the data packet to the second output port.

As the packet-type informatioin, a packet map table (PMT is preferably used.

In another preferred embodiment of the system according to the present invention, the stream of the multiplexed packets has been scrambled and a descrambler for descrambling the scrambled stream of the multiplexed packets is provided.

In this case, the packet-type information extractor and the packet-type checker may be provided prior or next to the descrambler.

In still another preferred embodiment of the system according to the present invention, the source signal including the multiplexed video, audio, and data packets is transmitted by a transmitter. The packet stream processor receives the source signal and extracts the stream of the multiplexed packets from the received source signal.

In a further preferred embodiment of the system according to the present invention, a storage subsystem is provided for storing the source signal including the multiplexed video, audio, and data packets. The packet stream processor extracts the stream of the multiplexed packets from the storage subsystem.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

FIRST EMBODIMENT

Figure 2:
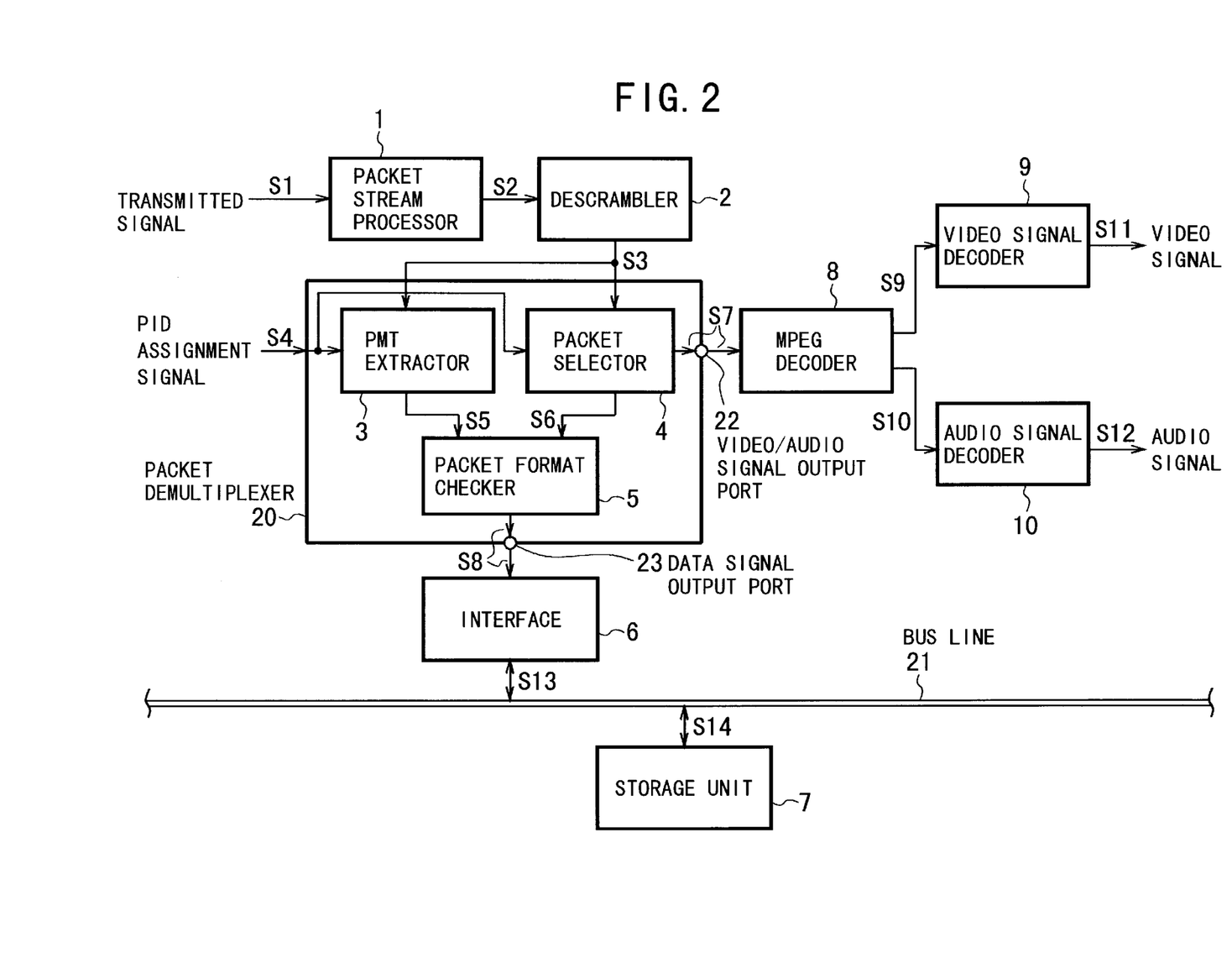
FIG. 2 is a block diagram of a digital information processing system with a copy protection subsystem according to a first embodiment of the present invention.

As shown in FIG. 2, a digital information processing system with a copy protection subsystem according to a first embodiment is comprised of a packet stream processor 1, a descrambler 2, a packet demultiplexer 20, an interface 6, a MPEG decoder 8, a video signal decoder 9, and an audio signal decoder 10. The packet demultiplexter 20 includes a PMT extractor 3, a packet selector 4, and a packet format checker 5. The interface 6 is electrically connected to a storage unit 7 through a bus line 21.

The packet stream processor 1 receives a transmitted signal S1 and extracts a stream S2 of video, audio, and data packets from the signal S1. The packets have been multiplexed in the stream S2 in conformity with the MPEG standard in a transmitter (not shown). Here, the signal S1 has been scrambled according to a specific format in the transmitter and therefore, the stream S2 of the multiplexed packets has been scrambled. The scrambled stream S2 of the packets is then outputted from the packet stream processor 1 to the descrambler 2.

The descrambler 2 descrambles the stream S2 of the scrambled, multiplexed video, audio, and data packets and outputs a descrambled stream S3 of the video, audio, and data packets to the packet demultiplexer 20. In this embodiment, the descrambled stream S3 of the packets is inputted into the PMT extractor 3 and the packet selector 4.

The PMT extractor 3 extracts the program map table (PMT) from the descrambled stream S3 of the packets and then, outputs the extracted PMT to the packet format checker 5 as a PMT signal S5, where the PMT is defined in the MPEG standard. This extraction process is performed according to a packet identifier (PID) assigned by a received PID assignment signal S4. The PID is typically assigned or specified by a user or operator of this digital information processing system. The PMT indicates the structure or format of the individual packets according to the PID.

The packet selector 4 selects one of the packets in the descrambled stream S3 according to the applied PID assignment signal S4. Then, the selected one of the packets is send to a video/audio signal output port 22 of the packet demultiplexer 20 as a signal S7 and to a data signal output port 23 thereof as a signal S6.

The packet format checker 5 checks the format of the signal S6 (i.e., the selected packet) using the signal S6 is a video or audio format, the packet format checker 5 destroys the signal S6 and prevents the signal S6 from being outputted to the interface 6. If the packet format of the signal S6 is a data format, the packet format checker 5 outputs the signal S6 to the interface 6 as a signal S8.

The interface 6 is used for transmitting the outputted signal S8 from the packet format checker 5 to the storage unit 7 as a signal S13 through the bus line 21.

The storage unit 7 stores a signal S14 corresponding to the signal S13 (i.e., the selected data packets) into a suitable storage medium.

The MPEG decoder 8 decodes the signal S7 (i.e., the video and/or audio packets) outputted through the video/audio signal output port 22 of the packet demultiplexer 20, thereby expanding the compressed video and audio signals in conformity with the MPEG standard. Thus, a video signal S9 is outputted to the video signal decoder 9 and an audio signal S10 is outputted to the audio signal decoder 10.

The video signal decoder 9 decodes the video signal S9 to produce an original analog video signal S11. The audio signal decoder 10 decodes the audio signal S10 to produce an original analog audio signal S12. The video and audio signals S11 and S12 are played back or reproduced by a popular video/audio playback system (not shown).

With the digital information processing system according to the first embodiment shown in FIG. 2, the streams S2 of the multiplexed video, audio, and data packets that have been multiplexed in the transmitted source signal in conformity with the MPEG standard is extrated by the packet stream processor 1 and then, the stream S2 is descrambled by the descrambler 2. Subsequently, the descrambled stream S3 of the multiplexed packets is demultiplexed by the packet demultiplexer 20 by selecting one of the packets in the stream S3 according to the assigned or specified PID of the packets.

Further, when the selected one of the packets is a video or audio packet, the packet demultiplexer 20 outputs the selected one of the packets through the video/audio signal output port 22 electrically connected to the video and audio signal decoders 9 and 10. When the selected one of the packets is a data packets through the data signal output port 23 for digital processing such as storage.

Thus, a data signal derived from the data packet is able to be digitally stored in a suitable storage medium using the storage unit 7 through the data signal output port 23 of the packet demultiplexer 20 while video and audio signals derived from the video and audio packets are prevented from being outputted to the bus line 21. In other words, the data signal excluding the video and audio signals is selectively recorded into a data storage medium.

As a result, illegal-copy protection of the audio and visual signals is ensured without changing the structure or format of the stream S2 of the multiplexed video, audio, and data packets.

Further, because no change is required for the structure or format of the stream S2 of the multiplexed video, audio, and data packets, the circuit scale of the digital information processing system does not become large and the fabrication cost thereof does not become high.

SECOND EMBODIMENT

Figure 3:
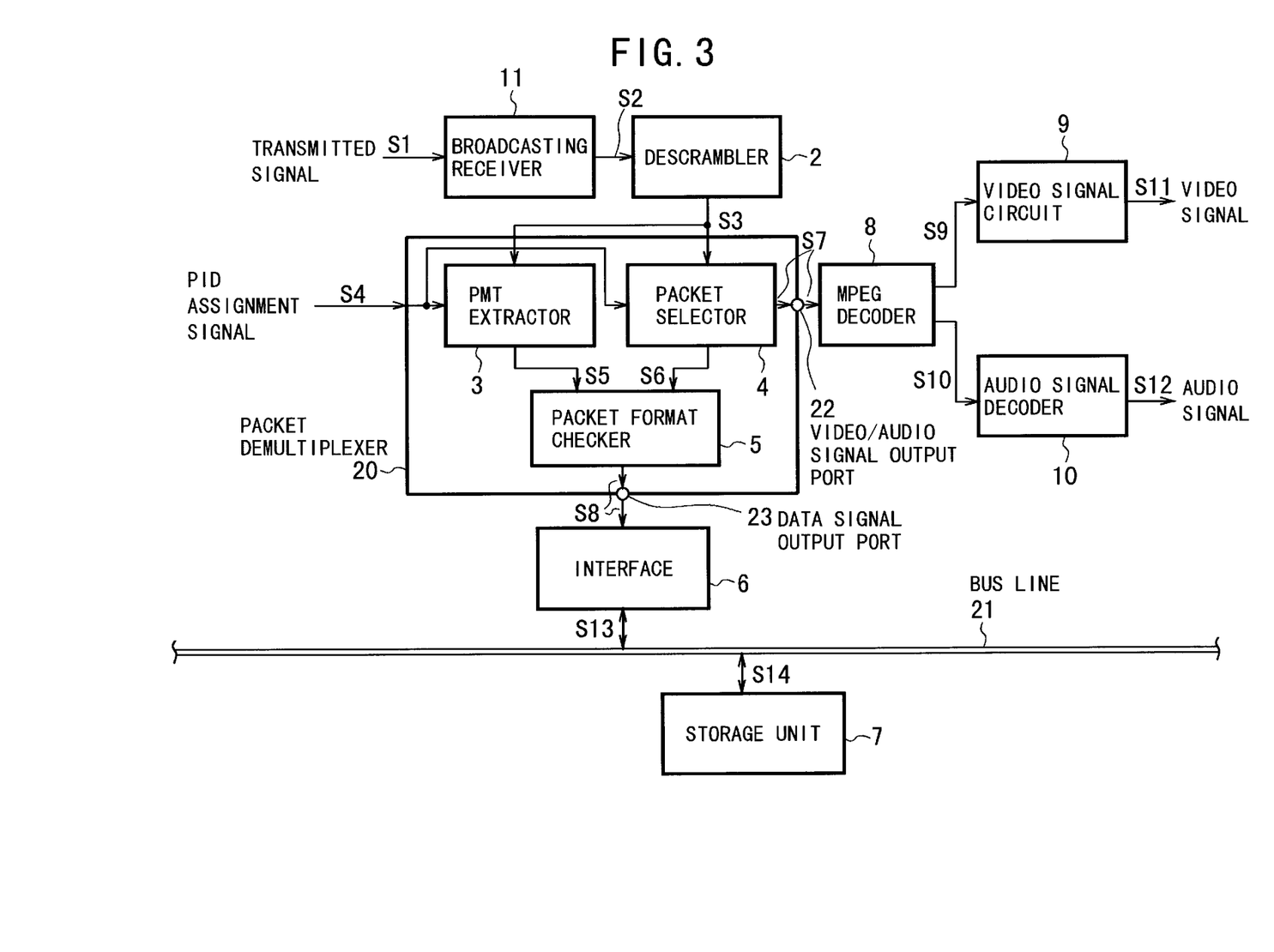
FIG. 3 is a block diagram of a digital information processing system with a copy protection subsystem according to a second embodiment of the present invention, which is applied to broadcasting.

FIG. 3 shows a digital information processing system according to a second embodiment of the present invention, which corresponds to a system obtained by applying the system according to the first embodiment to a broadcasting receiver.

The configuration in FIG. 3 is the same as that shown in FIG. 2 except that the packet stream processor 1 is replaced with a broadcasting receiver circuit 11. Therefore, the explanation about the same configuration is omitted here by attaching the same reference numerals as those in FIG. 2 to the same elements in FIG. 3 for the sake of simplification of description.

The broadcasting receiver circuit 11 performs the same processes as that of conventional broadcasting receivers. For example, the receiver circuit 11 receives the transmitted signal S1 through a parabola antenna or VHF/UHF antenna and then, selects a wanted channel according to the instruction of a user or operator. Further, the circuit 11 frequency-converts the information of the selected channel to the intermediate frequency (IF). After the conventional receiving processes are completed, the circuit 11 performs an Analog-to Digital (A/D) conversion of the transmitted signal S1, thereby generating the stream S2 of multiplexed video, audio, and data packets.

As necessary, digital demodulation of the stream S2 and decoding of the error correction code of the stream S2 are performed in the broadcasting receiver 11. Additionally, suitable processes to cope with interleaving canceling, transmission scrambling, and frame synchronization that have been applied to the transmitted signal S1 in a transmitter may be performed. The processes to be performed in the receiver circuit 11 at this stage are dependent upon the transmission format in the transmitter.

The descrambler 2 descrambles the stream S2 of the multiplexed packets that have been scrambled according to a specific format, and outputs the descrambled stream S3 of the packets. The descrambling is applied to the information to which an agreement of watching and listening or purchasing has been given. Therefore, the scrambling may not be made for the information necessitating no limit of utilization. In this case, the descrambler 2 may not perform the descrambling operation.

The PMT extractor 3 extracts the PMT from the descrambled stream S3 of the packets according to the PID assigned by the received PID assignment signal S4 by searching the stream S3 and then, outputs the extracted PMT to the data format checker 5 as the signal S5.

The packet selector 4 selects one of the video, audio, and data packets of the descrambled stream S3 according to the applied PID signal S4. Then, the selected video or audio packet is sent to the video/audio signal output port 22 of the packet demultiplexer 20 as the signal S7 and the selected data packet is sent to the data signal output port 23 thereof as the signal S6.

The PIDs for the video/audio signal output port 22 and the data signal output port 23 are different. Two different PIDs can be specified for the video/audio signal output port 22. One or more PIDs can be specified for the data signal output port 23, which enables the output of a plurality of data signals.

The data format checker 5 checks the data format of the signal S6 (i.e., the selected packet or packets) using the signal S5 indicating the extracted PMT. If the data format of the signal S6 is a video or audio format, the signal S6 is destroyed in the checker 5 and is not outputted through the data signal output port 23. If the data format of the signal S6 is a data format, the output of the signal S6 to the interface 6 is allowed through the output port 23.

If a PID corresponding to the data packet is set with respect to the video/audio signal output port 22, the data packet is applied to the MPEG decoder circuit 8 through the port 22. In this case, however, no problem will occur; because the data packet is not normally decoded in conformity with the MPEG standard and the decoded data is meaningless.

Further, since no storage unit is provided at the video/audio signal output port 22, the video and audio packets are unable to be digitally recorded or stored in a storage media.

If a PID corresponding to the video or audio packet is set with respect to the data signal output port 23, the data packet is prevented from being outputted by the data format checker 5 and is destroyed in the checker 5. Thus, there is no possibility that the video or audio packet is outputted to the data signal output port 23.

The interface 6 is used for transmitting the outputted signal S8 (i.e., the data packets) to the storage unit 7 through the bus line 21. The data signal derived from the data packets is advantageously processed by personal computers (PCs), because they are able to treat various data formats, to freely process the data, and to store the data into hard disk drives (HDDs).

The storage unit 7 stores a data signal S14 corresponding to the signal S13 (i.e., the selected data packets) into a suitable storage medium. It is popular that the data (e.g., computer programs and web data) excluding the video and audio signals are purchased and therefore, a subsystem or unit is necessary to store the purchased data until the user intentionally delete the data.

The video signal decoder 9 decodes the video signal S9 to produce an original analog video signal S11, thereby displaying the image on a screen of a television or PC monitor. Because the video signal S11 is analog, the signal S11 is unable to be copies without quality degradation.

The audio signal decoder 10 decodes the audio signal S10 to produce an original analog audio signal S12, thereby emitting the sounds and/or voices. Due to the same reason as that of the video signal S11, the signal S12 is unable to be copies without quality degradation.

With the digital information processing system according to the second embodiment shown in FIG. 3, it is obvious that there are the same advantages as those in the first embodiment of FIG. 2.

THIRD EMBODIMENT

Figure 4:
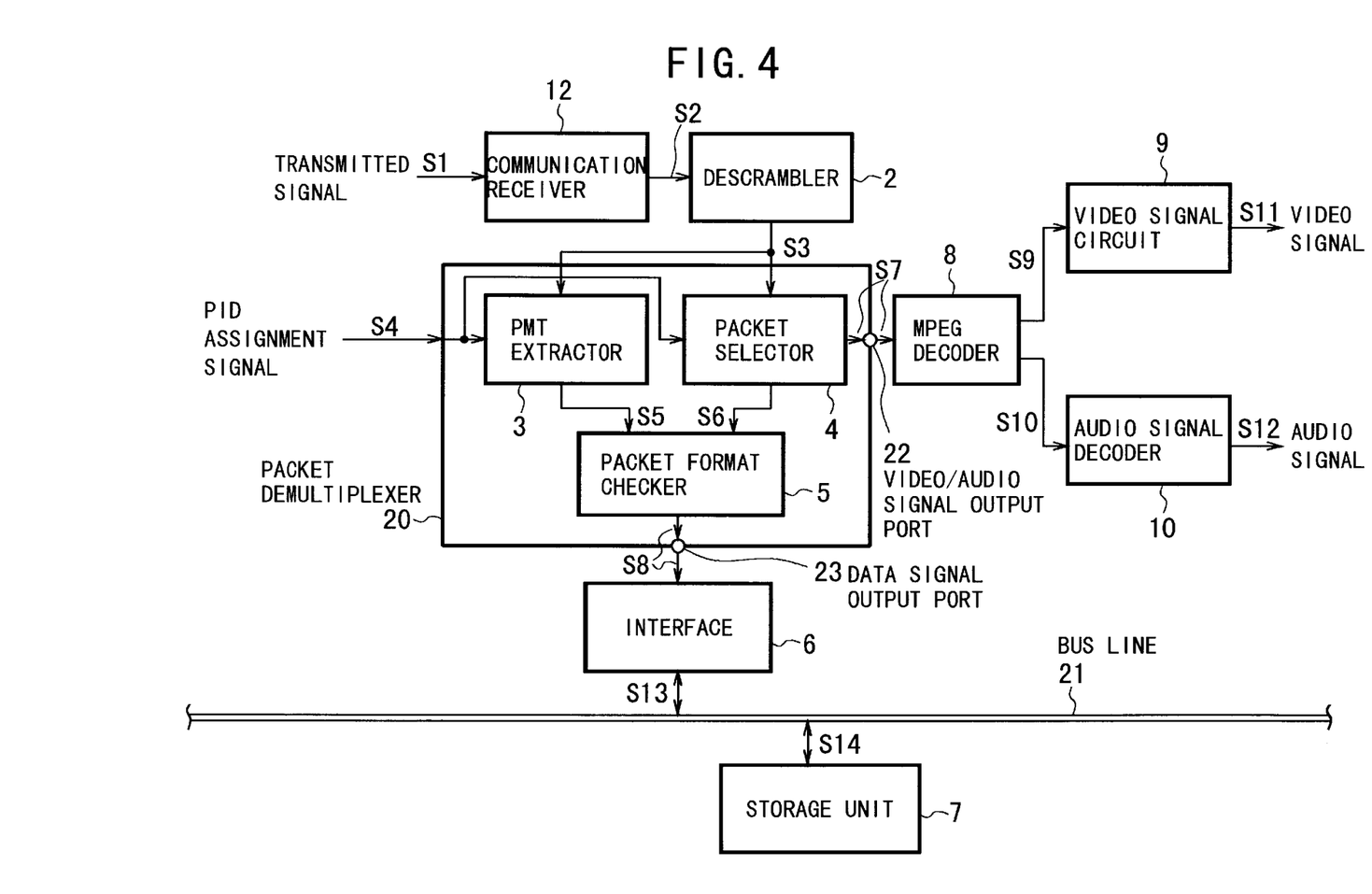
FIG. 4 is a block diagram of a digital information processing system with a copy protection subsystem according to a third embodiment of the present invention, which is applied to telecommunication.

FIG. 4 shows a digital information processing system according to a third embodiment of the present invention, which corresponds to a system obtained by applying the system according to the first embodiment to a communication receiver.

The configuration in FIG. 4 is the same as that shown in FIG. 2 except that the packet stream processor 1 is replaced with a communication receiver circuit 12. Therefore, the explanation about the same configuration is omitted here by attaching the same reference numerals as those in FIG. 2 to the same or corresponding elements in FIG. 4 for the sake of simplification of description.

The communication receiver circuit 12 performs the same processes as that of conventional communication receivers. For example, the receiver circuit 12 receives the transmitted signal S1 through a transmission path such as a metal cable or optical fiber (not shown) according to a specific transmission protocol.

It is obvious that there are the same advantages as those in the first embodiment.

FOURTH EMBODIMENT

Figure 5:
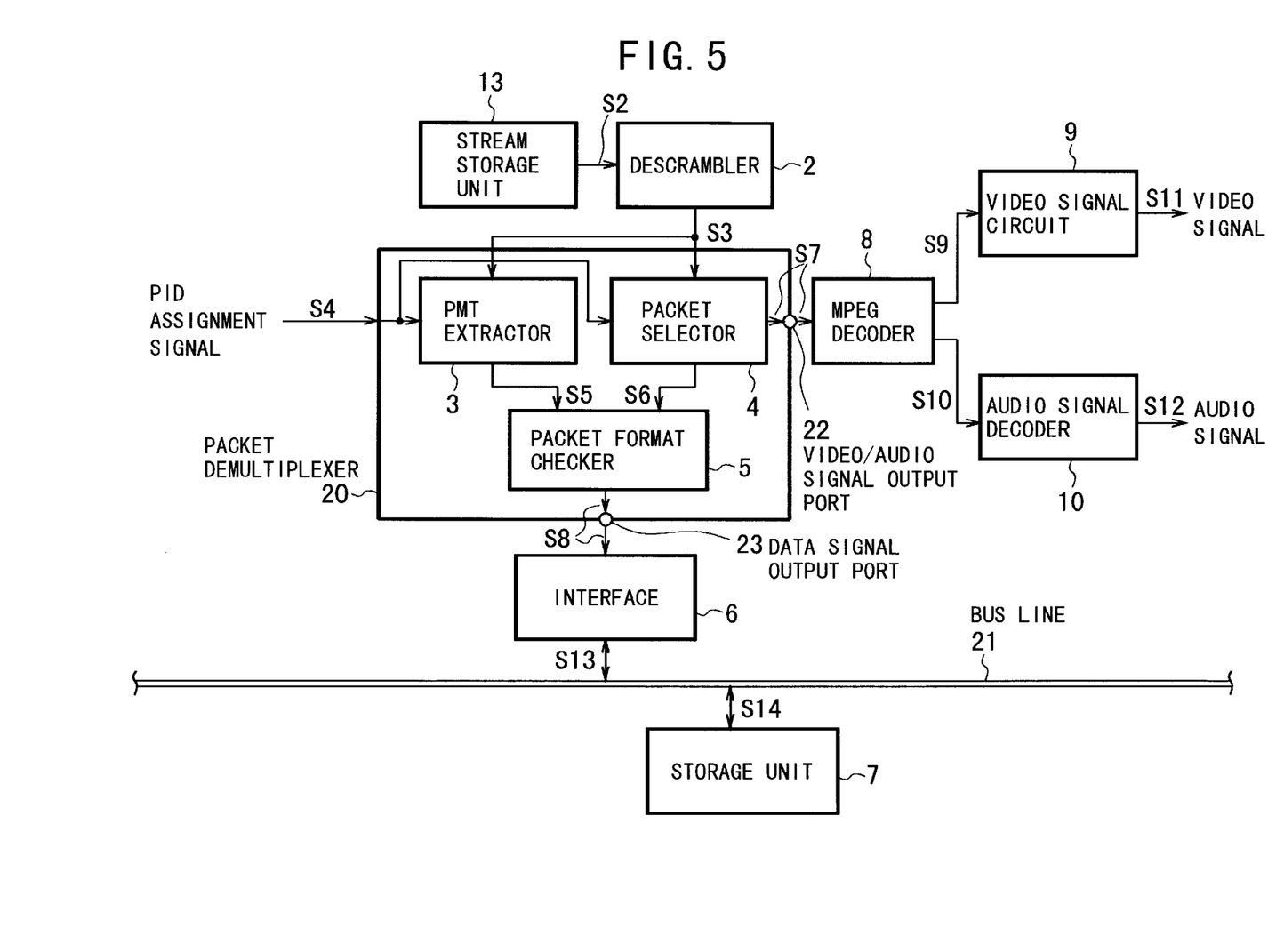
FIG. 5 is a block diagram of a digital information processing system with a copy protection subsystem according to a fourth embodiment of the present invention, which is applied to data storage.

FIG. 5 shows a digital information processing system according to a fourth embodiment of the present invention, which corresponds to a system obtained by applying the system according to the first embodiment to a stream storage unit such as a digital video disk (DVD) playback unit.

The configuration in FIG. 5 is the same as that shown in FIG. 2 except that the packet stream processor 1 is replaced with a stream storage unit 13. Therefore, the explanation about the same configuration is omitted here by attaching the same reference numerals as those in FIG. 2 to the same or corresponding elements in FIG. 5.

The stream storage unit 13 stores the various multiplexed streams of the video, audio, and data packets in conformity with the MPEG standard in a suitable storage medium, and serves as an information source of the video, audio, and data signals. The unit 13 performs the same processes as that of conventional storage units such as Hard Disk Drives (HDDs), Flexible Disk Drives (FDDs), disk arrays, magnetic recording apparatuses, optical recording apparatuses, IC or memory cards, semiconductor memories, or the like.

For example, the storage unit 13 reads out a specified one of the multiplexed streams according to the instruction of a user. The stream of the video, audio, and data packets is transmitted to the descrambler 1 as the signal S2.

It is obvious that there are the same advantages as those in the first embodiment.

FIFTH EMBODIMENT

Figure 6:
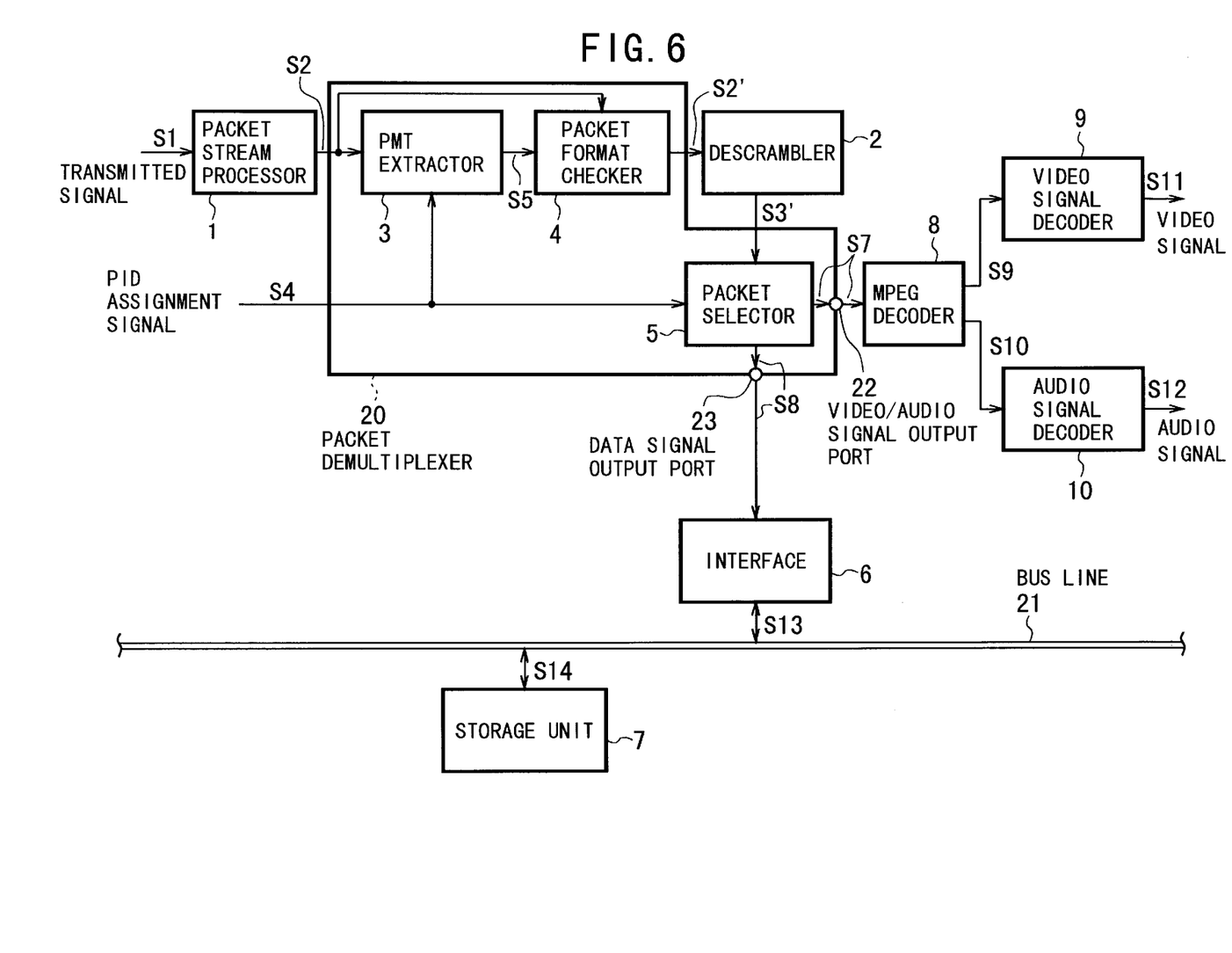
FIG. 6 is a block diagram of a digital information processing system with a copy protection subsystem according to a fifth embodiment of the present invention, in which only the selected packets are descrambled.

FIG. 6 shows a digital information processing system according to a fifth embodiment of the present invention.

The configuration in FIG. 6 is the same as that shown in FIG. 2 except that the PMT extractor 3 and the packet format checker 4 of the packet demultiplexer 20 are located prior to the descrambler 2. Therefore, the explanation about the same configuration is omitted here by attaching the same reference numerals as those in FIG. 2 to the same or corresponding elements in FIG. 6.

The stream S2 of the packets is directly supplied to the PMT extractor 3 and the packet format checker 4 of the packet demultiplexer 20. The PID assignment signal S4 is inputted into the PMT extractor 3 and the packet selector 5. Therefore, the packets of the stream S2 are limited or selected prior to the descrambling operation by the descrambler 2.

The video and audio packets in the stream S2 which are selected for the data signal output port 23 are destroyed in the packet format checker 4. The video and audio packets in the stream S2 which are selected for the video/audio signal output port 22 are supplied to the descrambler 2 as an output signal S2'. The data packets in the stream S2 which are selected for the data signal output port 23 are supplied to the descrambler 2 as the signal S2'. A descrambled packets of the stream S2 is supplied to the packet selector 5 as an output signal S3' of the descrambler 2.

It is obvious that there are the same advantages as those in the first embodiment.

It is needless to say that the packet stream processor 1 in the fifth embodiment may be replaced with the broadcasting receiver circuit 11 in FIG. 3, the communication receiver circuit 12 in FIG. 4, or the stream storage unit 13 in FIG. 5.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A system for providing copy protection for audio and video components of a packet stream, comprising:
    a packet stream processor for extracting a stream of multiplexed video, audio, and data packets that have been multiplexed in a source signal in conformity with the MPEG standard; and,
    a packet demultiplexer for demultiplexing said stream of multiplexed packets by selecting packets in said stream according to assigned packet identifiers (PIDs) of said packets, said packet demultiplexer having a first output port connected to an MPEG decoder, and a second output port connected to provide storage of packets outputted therethrough;
    wherein, when a selected packet is a video or audio packet, said packet demultiplexer outputs said selected packet through said first output port to said MPEG decoder; and
    wherein, when said selected packet is a data packet, said packet demultiplexer outputs said selected packet through said second output port.

2. The system as claimed in claim 1, wherein said packet demultiplexer includes a packet-type information extractor for extracting a packet-type information included in said stream according to said assigned PID of said packets, and a packet-type checker for checking the type of said packets using said packet-type information extracted by said extractor and for selectively outputting said video and audio packets to said first output port and said data packet to said second output port.

3. The system as claimed in claim 2, wherein a packet map table is used as said packet-type information.

4. The system as claimed in claim 1, wherein said stream of said multiplexed packets has been scrambled and a descrambler for descrambling said scrambled stream of said multiplexed packets is provided.

5. The system as claimed in claim 4, wherein a packet-type information extractor and a packet-type checker are provided downstream from said descrambler.

6. The system as claimed in claim 4, wherein a packet-type information extractor and a packet-type checker are provided upstream from said descrambler.

7. The system as claimed in claim 1, wherein said source signal including said multiplexed video, audio, and data packets is transmitted by a transmitter; and wherein said packet stream processor receives said source signal and extracts said stream of said multiplexed packets from said received source signal.

8. The system as claimed in claim 1, wherein said source signal including the multiplexed video, audio, and data packets is stored in a storage subsystem, and wherein said packet stream processor extracts said stream of said multiplexed packets from said storage subsystem.

9. A personal computer media player providing copy protection for audio and video components, comprising:

a signal source providing a stream of audio, video and data packets that are multiplexed in accordance with the MPEG standard;

a packet demultiplexer for demultiplexing said packets by selecting packets according to assigned packet identifiers (PIDs) of said packets;

an MPEG decoder coupled to a first port of said demultiplexer;

a bus coupled to a second port of said demultiplexer; and a storage coupled to said bus, the demultiplexer selectively providing only said audio and video packets to said MPEG decoder, and selectively providing only said data packets to said bus.

10. A method for providing copy protection for audio and video data in a personal computer media player, comprising:

receiving a stream of audio, video and data packets that are multiplexed in accordance with the MPEG standard; and demultiplexing said packets according to assigned packet identifiers (PIDs) of said packets, said demultiplexing comprising:

selectively providing only said audio and video packets to an MPEG decoder; and selectively providing only said data packets to a bus coupled to a storage, such that said audio and video packets are not provided to the bus coupled to the storage.

\* \* \* \* \*